US012620796B2

(12) United States Patent
Pal et al.

(10) Patent No.: US 12,620,796 B2
(45) Date of Patent: May 5, 2026

(54) DATA ANALYTICS FOR SMART ELECTRICAL PROTECTION SYSTEMS

(71) Applicant: ABB Schweiz AG, Baden (CH)

(72) Inventors: Mayukha Pal, Ameenpur (IN); Alok Kumar Bharati, Davangere (IN); Satish Shamsundar Belkhode, Wardha (IN)

(73) Assignee: ABB Schweiz AG, Baden (CH)

( * ) Notice: Subject to any disclaimer, the term of this patent is extended or adjusted under 35 U.S.C. 154(b) by 781 days.

(21) Appl. No.: 17/983,609

(22) Filed: Nov. 9, 2022

(65) Prior Publication Data

US 2023/0062725 A1     Mar. 2, 2023

Related U.S. Application Data

(63) Continuation of application No. PCT/IB2021/054091, filed on May 13, 2021.

(30) Foreign Application Priority Data

May 14, 2020     (IN) .............................. 202041020403

(51) Int. Cl.
*H02H 1/00*          (2006.01)
*H02J 13/36*         (2026.01)

(52) U.S. Cl.
CPC ........ *H02H 1/0092* (2013.01); *H02H 1/0023* (2013.01); *H02J 13/36* (2026.01)

(58) Field of Classification Search
CPC .......... G06N 7/01; G06N 3/006; G06N 20/00; H02J 2203/10; H02J 13/00002; Y02E 60/00; Y04S 10/30; H02H 3/006
See application file for complete search history.

(56) References Cited

U.S. PATENT DOCUMENTS

2008/0262820 A1* 10/2008 Nasle ................... G05B 13/048
                                                                705/412
2013/0258537 A1* 10/2013 Wylie ...................... H02H 3/08
                                                                361/87

(Continued)

FOREIGN PATENT DOCUMENTS

KR     10-2019-0119207 A     10/2019
KR          20190119207 A  * 10/2019  ............. G06N 20/00

OTHER PUBLICATIONS

European Patent Office, International Search Report in International Patent Application No. PCT/IB2021/054091, 3 pp. (Sep. 29, 2021).

(Continued)

*Primary Examiner* — Mohammad Ali
*Assistant Examiner* — Dhruvkumar Patel
(74) *Attorney, Agent, or Firm* — Fitch Even Tabin & Flannery LLP

(57)                ABSTRACT

A system and method for protecting an electric power distribution system integrated with a hybrid machine-learning model includes a plurality of field protection systems, a plurality of electrical switching circuits, and a local area network. Data from each of the plurality of field protection systems that is connected to the electrical switching circuits that are configured for protecting the electric power distribution system, is transmitted to the cloud. The received data is processed to identify a change in patterns and compute an error related to the HMLM in comparison with the processed data. The HMLM that is implemented in the plurality of FPS is calibrated to minimize the error and send updates to develop a new decision making firmware thereby to control actuation of the plurality of the electrical switching circuits.

11 Claims, 8 Drawing Sheets

(56)　　　　　　References Cited

U.S. PATENT DOCUMENTS

| 2017/0365992 | A1* | 12/2017 | Shin | .......................... | H02H 3/05 |
| 2019/0296547 | A1* | 9/2019 | Kelly | ....................... | H02J 3/004 |
| 2020/0292608 | A1* | 9/2020 | Yan | ...................... | G05B 23/024 |

OTHER PUBLICATIONS

European Patent Office, Written Opinion in International Patent Application No. PCT/IB2021/054091, 6 pp. (Sep. 29, 2021).

* cited by examiner

500

DATA ANALYTICS FOR SMART ELECTRICAL PROTECTION SYSTEMS

CROSS-REFERENCE TO RELATED APPLICATIONS

This patent application claims priority to International Patent Application No. PCT/IB2021/054091, filed on May 13, 2021, and to Indian Patent Application No. 202041020403, filed on May 14, 2020, each of which is incorporated herein in its entirety by reference.

FIELD OF THE DISCLOSURE

The present disclosure generally relates to smart electrical protection systems and, more particularly, to a system and method for protecting an electric power distribution system integrated with a hybrid machine-learning model (HMLM).

BACKGROUND OF THE INVENTION

Generally, protection devices such as circuit breakers or switch gears are in operation for safety of a customer property. These protection devices are utilized to minimize a delay in fault detection and isolation of faulty equipment from an electrical circuit. Early detection and localization of faults, and prompt removal from service of the faulty equipment, is performed to safeguard the entire system, ensure continuity of supply, and minimize damage and repair costs.

At some instances, due to field noise like EMI conditions or other operating load conditions, noises are injected into the electrical circuit. The protection devices pick up those noises, which may lead to certain trip conditions like GF, RELT etc. as nuisance trips, and as a result corresponding electrical circuits or elements may get isolated. Some noises are injected due to human error by introducing a potential arc flash before operating a switch on a panel, which can lead to tripping of the circuit breaker (CB). In many cases, these nuisance trips may create inconvenience to the customer or undermine critical true safety events. Conventionally, filters are used to check the injected noises to make decisions accordingly on tripping the electrical circuits. But those filters are designed based on laboratory testing results and cannot be adapted to environmental changes.

Especially, for noises such as electromagnetic interference (EMI), the filters are not capable enough to characterize sources of the EMI, according to the environmental changes. In some internet of things (IOT) based tripping circuits, the decision is made by considering loads of the electrical circuit for isolation. Such IOT based tripping of electrical circuits will not characterize the load and need a Cloud or central server to communicate between a breaker fleet within a home or building, before making the tripping decision. In most of the cases, data such as trip data, signatures of events, sensor data, historical events, non-electrical parameter data such as temperature, vibrations, humidity and so on are not analyzed in making decisions before isolating the electrical circuit.

BRIEF SUMMARY OF THE INVENTION

Based on the foregoing, there is a need for a system and method for protecting an electric power distribution system integrated with a hybrid machine-learning model (HMLM) to make decisions based on a real-time data and also by learning nuisance trip events and its environmental conditions for isolating noise parameters and adapting to ignore them.

The present disclosure is directed to a system and method configured and operating to mitigate, alleviate or eliminate one or more of the above-identified deficiencies and disadvantages in the prior art and solve at least the above-mentioned problem.

Accordingly, an embodiment herein provides a first aspect of a system for protecting an electric power distribution system integrated with a hybrid machine-learning model (HMLM) and a second aspect of a method for protecting an electric power distribution system integrated with a HMLM. Further, in view of the foregoing, another embodiment herein provides a third aspect of a field protection system (FPS) integrated with a hybrid machine-learning model (HMLM) and a fourth aspect of a method implemented in a field protection system (FPS) integrated with a HMLM. Furthermore, in view of the foregoing, yet another embodiment herein provides a fifth aspect of a field protection system (FPS) integrated with a hybrid machine-learning model (HMLM) and a sixth aspect of a method implemented in a field protection system (FPS) integrated with a HMLM.

BRIEF DESCRIPTION OF THE SEVERAL VIEWS OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION OF THE INVENTION

Figure 1:
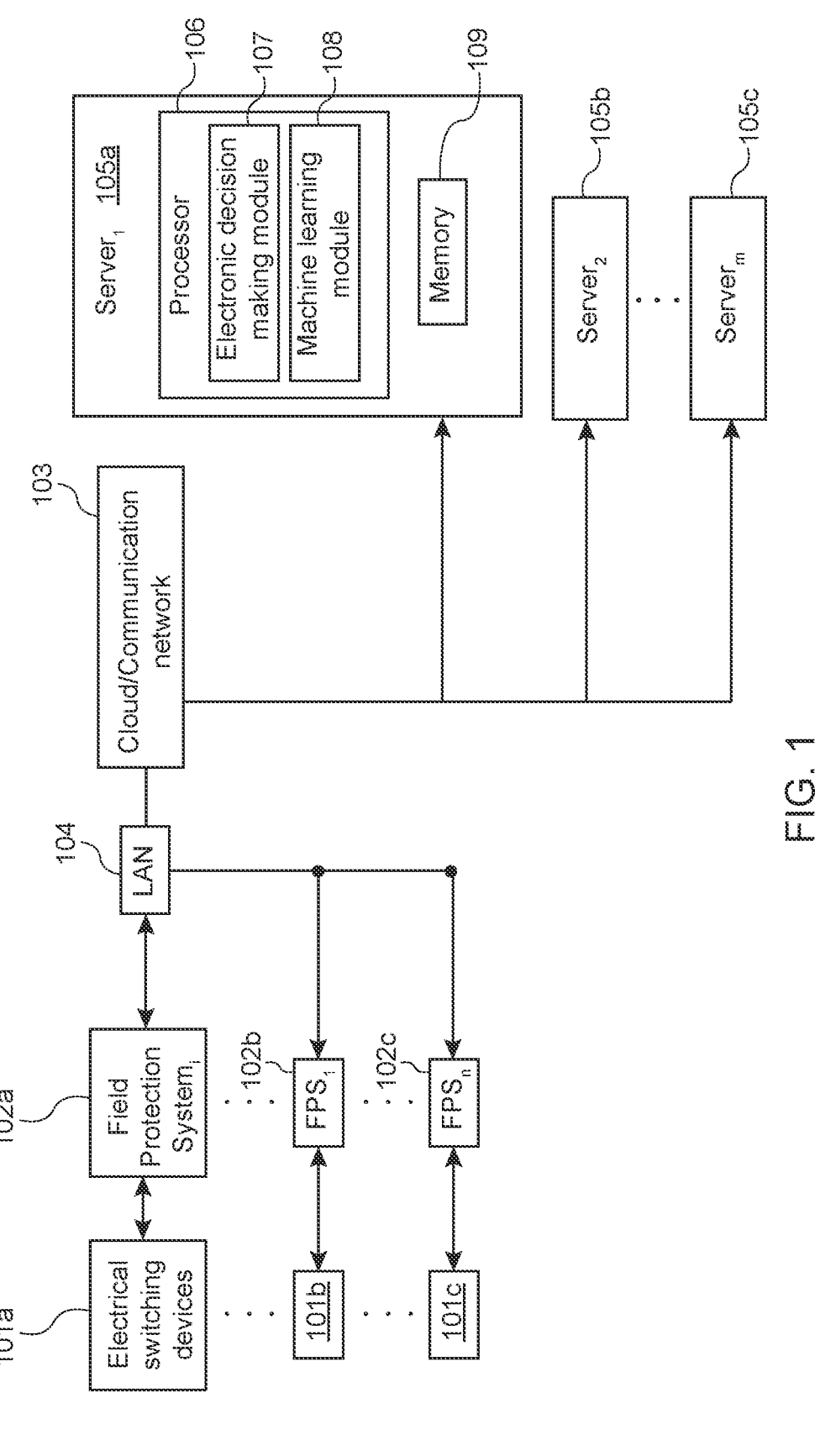
FIG. 1 is a block diagram for a system for protecting an electric power distribution system integrated with a hybrid machine-learning model (HMLM), according to the present disclosure.

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there is a need for a system and a method for protecting an electric power distribution system integrated with a hybrid machine-learning model (HMLM) to avoid nuisance tripping. The embodiments herein achieve this by providing a system integrated with a hybrid machine-learning model (HMLM) that protects the electric power distribution system using a supervised or unsupervised learning from a cloud or other neighboring devices that are connected in a mesh network along with a real time data. Referring now to the drawings, and more particularly to FIGS. 1 through 8, where similar reference characters denote corresponding features consistently throughout the figures, there are shown preferred embodiments.

FIG. 1 illustrates a system for protecting an electric power distribution system integrated with a hybrid machine-learning model (HMLM), according to a first aspect of an embodiment. The system 100 for protecting an electric power distribution system integrated with a hybrid machine-learning model (HMLM) comprising, a cloud or central server (103) comprising one or more servers (105a, 105b, 105c) connected to a plurality of field protection systems (FPSs) (102a, 102b, 102c) through a communication network (103). The plurality of FPSs (102a, 102b, 102c) are connected to a plurality of electrical switching circuits (101a, 101b, 101c) that are configured for protecting the electric power distribution system. The plurality of field protection systems (102a, 102b, 102c) are configured to transmit continuously or periodically, a data from each of the plurality of FPSs (102a, 102b, 102c) to the plurality of FPSs (102a, 102b, 102c) that are connected in a same local area network (LAN) (104) or one or more servers (105a,105b, 105c) of the central server. The data includes time stamped processed electrical and non-electrical parameters and signals. The one or more servers comprises a processor (106) and a memory (109). The processor (106) includes but is not limited to an electronic decision-making module (107) and machine-learning module (108).

According to the first aspect of an embodiment, the processor (106) is configured to: process the received data to identify change in patterns of the data or real-time data that are time stamped and extract data that are changed in patterns from a predefined list of data provided in the HMLM and perform analysis on the processed data using the HMLM by computing an error related to the HMLM in comparison with the processed data. The data/feature extraction or pattern recognition through de-trending and possible correlation may be performed to check the persistence and self-similarity structures. Self-similar structures are kind of repeating patterns at varying scale of observation window during the analysis of fluctuations of the data under consideration. The HMLM may perform Machine-learning (ML) algorithm on the cloud to use the real-time data as augmented data for deep learning. The processor (106) is configured to calibrate the HMLM to minimize the error and update a decision-making firmware or weighted output parameters of the plurality of FPS (102a, 102b, 102c), from the calibrated HMLM to develop a new decision making firmware or the weighted output parameters. In an initial stage of decision making event occurrence, clustering techniques are adapted for grouping and classification to make the system to learn. As more data and decision events are gathered, the electrical power distribution circuit/network of protection devices get trained through regression methodologies for learning and in turn prepares it as an adaptive protection system for decision-making. With each step of decision-making, error percentage (%) is calculated for improvement in accuracy of learning and decision making. This leads to a progressive, smarter and faster optimized learning method for the network. After sufficient learning in the system with reduced error, the ML method uses data nodes as neurons of the network for optimized forecasting of the data or parameters that allows a decision forecast on protection with improved efficiency.

According to the first aspect of an embodiment, the processor (106) is further configured to send the update regarding the new decision making firmware or the weighted output to the plurality of field protection systems to control actuation of each of the connected plurality of the electrical switching circuits. For example, through computational learning, a new decision making firmware is built from an initial learning phase, which progressively trains the hybrid machine-learning (ML) model for the given network of devices and in turn, decision-making ability is established using the HMLM.

According to the first aspect of an embodiment, the plurality of FPSs (102a, 102b, 102c) is further configured to receive a new decision making firmware or weighted output parameters for the plurality of field protection system from other plurality of field protection systems that are connected through the same LAN, to thereby further calibrate the HMLM. The plurality of FPSs (102a, 102b, 102c) is further configured to utilize the new decision making firmware or the weighted output parameters to update the HMLM by supervised and unsupervised machine-learning thereby to make future decisions in the FPS (102a).

In an example scenario of Reduced Energy Let Through (RELT) operating mode in a circuit breaker, the settings of the breakers are lowered to a pre-determined value. In most cases, the personnel coming for maintenance (reason for going into RELT mode) carry wireless radio frequency (RF) communicating devices. The RF communicating devices generally have high electromagnetic radiation and affect the operation of the trip unit. This affects the pick-up at lowered thresholds and thus may lead to nuisance trip. The proposed machine-learning method will help to understand in detail how each of the protection systems in the field behaves when experiencing a RELT mode and adapt itself to an appropriate threshold.

According to the first aspect of an embodiment, the time stamped processed electrical and non-electrical parameters and signals include, but are not limited to, device ID, phase current, phase voltage, power-factor, bus-bar temperatures, accelerometer data, vibrations recorded, ambient environmental temperature, level of humidity near the electrical switching circuits, geographical location, ambient Electromagnetic field Intensity (EMI) characteristics, arc signatures, load characteristics, building characteristics, nuisance trip and trip or no trip or pick-up or drop out signals. Various embodiments described herein utilize data collected from the plurality of sensors through data acquisition units.

According to the first aspect of an embodiment, the electrical switching circuits (101a,101b, 101c) include an electronic tripping circuit and one or more actuators; and the electronics tripping circuit is enabled with an Ethernet communication capability. The communication network (103) utilizes a wired communication network or a wireless communication network with one or more repeater devices.

Figure 2:
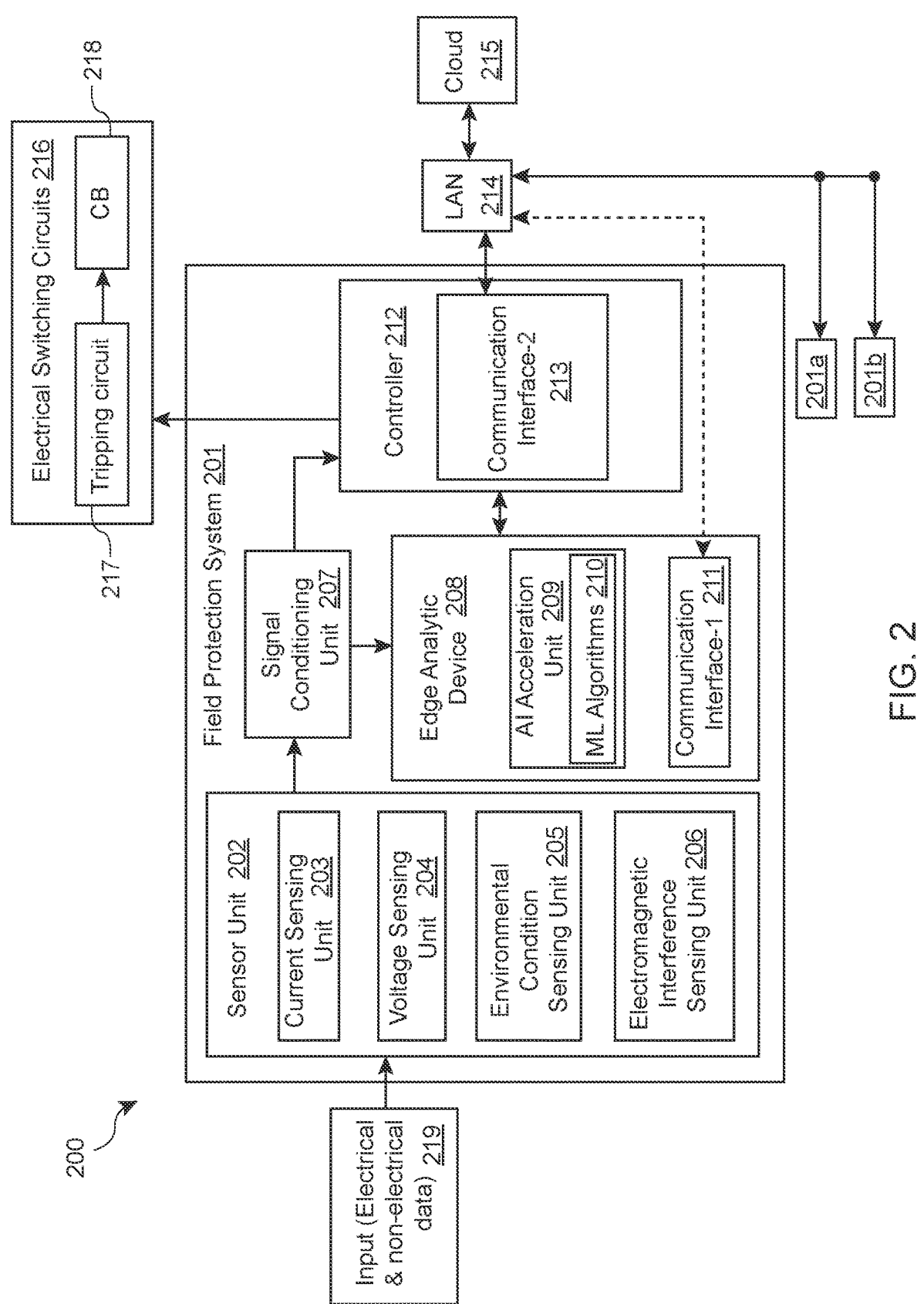
FIG. 2 is a functional diagram of a field protection system (FPS) integrated with a hybrid machine-learning model (HMLM) according to the present disclosure.

FIG. 2 illustrates a field protection system (FPS) integrated with a hybrid machine-learning model (HMLM) (200), according to a third aspect of another embodiment. According to the third aspect of another embodiment, the FPS (201) integrated with a hybrid machine-learning model (HMLM) comprises a sensing unit (202), a signal-conditioning unit (207), an edge analytic device (EAD) (208) and a controller (212). The FPS (201) is connected to an electrical switching circuit (216) configured for protecting the electric power distribution system. The sensing unit (202) comprises a plurality of sensors configured to sense data that includes a plurality of electrical and non-electrical parameters and signals from each of a plurality of electrical switching circuits (216). The sensing unit (202) includes but is not limited to a current sensing unit (203), a voltage sensing unit (204), an environmental-condition sensing unit (205) and an electromagnetic-interference (EMI) sensing unit (206). The signal-conditioning unit (207) is configured to process the data received from the sensing unit (202), compatible for communicating with a central server or a cloud (215), and transmit the processed data to a controller (212) and to an edge analytic device (EAD) (208). The EAD (208) includes but is not limited to an AI acceleration unit (209), machine-learning (ML) algorithms (210) and a first communication interface (211). The central server comprises one or more servers that are connected to the FPS (201) through a communication network or a Local Area Network (LAN) (214).

According to the third aspect of another embodiment, the EAD (208) is configured to: perform supervised or unsupervised machine learning locally from the data that are received from the signal-conditioning unit (207) and extract data that are changed in patterns from a predefined list of data provided in the HMLM. For example, the extraction of data or pattern recognition through de-trending and possible correlation is performed to check the persistence and self-similarity structures. The self-similar structures are repeating patterns at varying scale of observation windows during the ML or analysis of changes/fluctuations of the data/signal under consideration.

The EAD (208) is further configured to: make local decisions based on a Machine-learning algorithm and the extracted data; time stamp the extracted data; and transmit the time stamped data and the local decision to the controller through a first communication interface (211). The local decisions are related to decisions that are made either to trip the circuit breaker or to avoid nuisance tripping, under sure/predefined conditions of the electrical switching circuits. Further, the local decisions include decisions on tripping the circuit breaker under unsure condition or critical situation and informing that the decision is taken based on unsure condition, to the cloud (215) or other FPS (201a, 201b) that are connected in the same LAN (214), through the controller (212) or the EAD (208). As used herein, the term "local decision" refers to an output of machine learning (supervised or unsupervised or hybrid) algorithms that are being processed in the EAD without requiring communication with the central server or cloud.

According to the third aspect of another embodiment, the controller (212) is configured to: receive the time stamped data and the local decision through a second communication interface (213) from the first communication interface (211) of the EAD (208); and process the time stamped data and the local decision using decision making firmware to make decisions to control actuation of each of the connected plurality of the electrical switching circuits (216). The electrical switching circuits (216) comprise one or more circuit breakers (218) and one or more trip-unit/tripping circuit (217).

According to the third aspect of another embodiment, the controller (212) is further configured to transmit, either continuously or periodically, the time stamped data to the one or more servers of the central server or the cloud (215) or other field protection systems (FPSs) (201) through the LAN (214). The controller (212) is further configured to: receive a new decision making firmware or weighted output parameters for the FPS (201) from the cloud (215), from one or more servers, or from the other FPSs (201a, 201b), through the LAN based on a calibration of the HMLM, and is further configured to utilize the new decision making firmware or the weighted output parameters to update the HMLM thereby to make future decisions in the FPS (201).

According to the third aspect of another embodiment, the plurality of electrical and non-electrical parameters and signals includes, but is not limited to, device ID, phase current, phase voltage, power-factor, bus-bar temperatures, accelerometer data, vibrations recorded, ambient environmental temperature, level of humidity near the electrical switching circuits, geographical location, ambient Electromagnetic field Intensity (EMI), EMI source characteristics, arc signatures, load characteristics, building characteristics, nuisance trip and trip or no trip or pick-up or drop out signals.

According to the third aspect of another embodiment, the controller (212) is further configured to make decisions in the future as to whether to actuate the electrical switching circuits (216) based on a user feedback, in party, by utilizing reinforced learning under critical situations, after actuating the one or more circuit breakers (217). The critical situation includes but is not limited to unsure decisions of the HMLM related to a change in pattern of the data sensed from the sensing unit (202) of the FPS (201).

According to the third aspect of another embodiment, the EAD (208) is further configured to: encrypt the time stamped data for data security; and transmit the time stamped data to one or more servers of a central server or a cloud (215) through the first communication interface (211), when the controller (212) is bypassed from the LAN (214) or cloud (215) for future decision making. The EAD (208) can communicate with the other field protection systems (201a, 201b) (EAD of different field protection systems) in the presence or absence of the central server or cloud (215).

Figure 3:
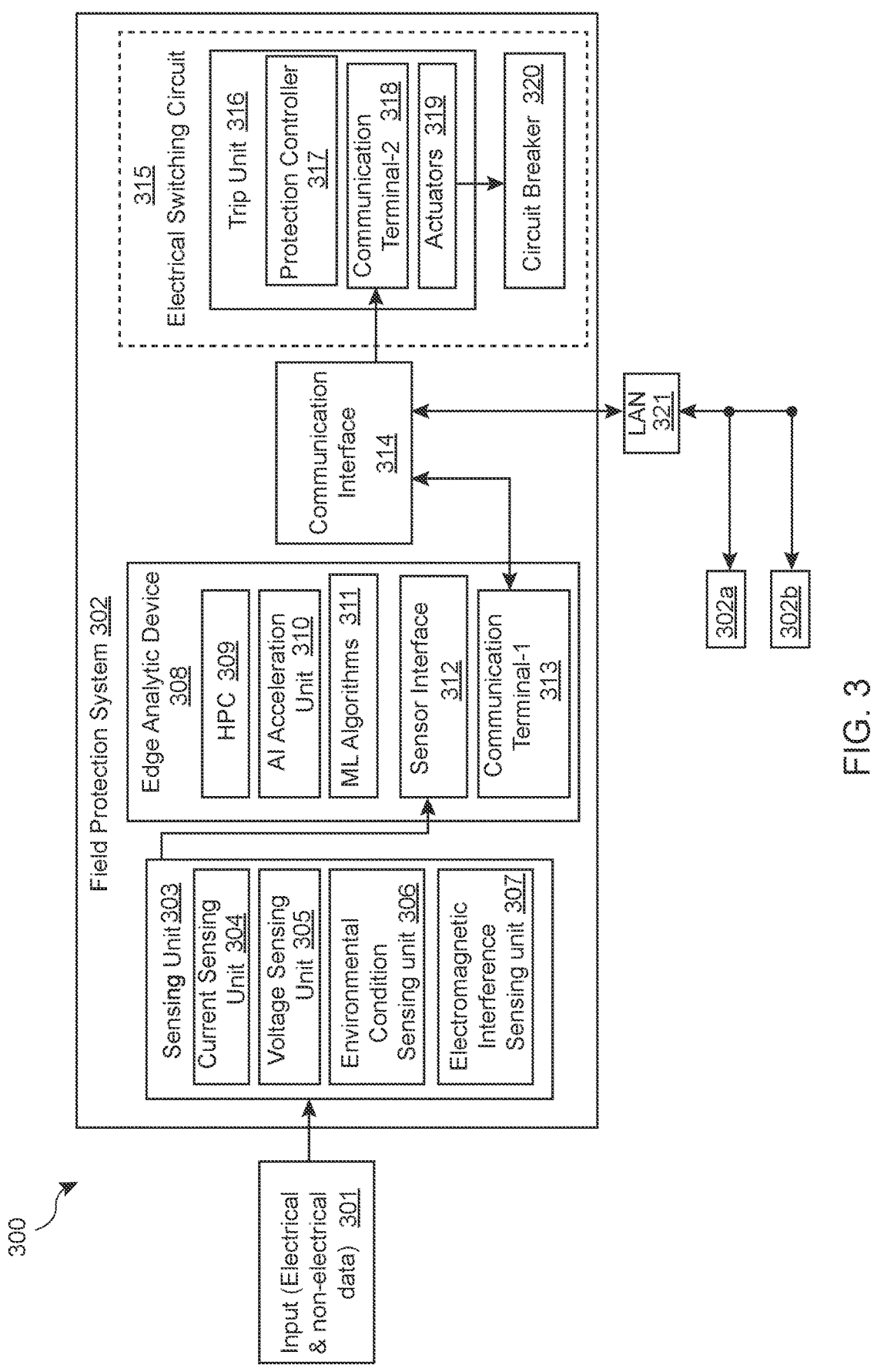
FIG. 3 is a block diagram of a field protection system (FPS) integrated with a hybrid machine-learning model (HMLM) according to the present disclosure.

FIG. 3 illustrates a field protection system (FPS) integrated with a hybrid machine-learning model (HMLM) 300, according to a fifth aspect of another embodiment. According to a fifth aspect of another embodiment, there is provided a field protection system (FPS) (302) integrated with a hybrid machine-learning model (HMLM) for protecting the electric power distribution system. The FPS (302) comprises a sensing unit (303), an edge analytic device (EAD) (308), a communication interface (314) and an electrical switching circuit (315). The sensing unit (303) comprises a plurality of sensors configured to sense a data that includes a plurality of electrical and non-electrical parameters from each of a plurality of electrical switching circuit (315) and transmit the data to an edge analytic device (EAD) (308). The EAD (308) comprises a processor (309), an Artificial-Intelligence (AI) acceleration unit (310), ML algorithms (311), a sensor interface (312) and a first communication terminal (313). The processor (309) is a high performance computer (HPC).

According to a fifth aspect of another embodiment, the processor is configured to: perform supervised or unsupervised machine learning locally from the data that is received from the sensing unit (303) through the sensor interface (312) and extract data that is changed in patterns from a predefined list of data provided in the HMLM; make local decisions based on a Machine-Learning algorithm (311) and the extracted data. The processor is further configured to: time stamp the extracted data; and transmit the time stamped data and the local decision to the electrical switching circuit (315) through the first communication terminal (313) via a communication interface (314). The communication interface (314) is connected to a LAN (321) using a wired/wireless communication network.

According to the fifth aspect of another embodiment, the processor (309) is further configured to: encrypt the time stamped data for data security; communicate the encrypted time stamped data to other field protection systems (FPSs) (302a, 302b) through the first communication terminal (313) via the LAN (321) thereby to calibrate the HMLM. The processor (309) is further configured to: utilize the new decision making firmware or the weighted output parameters to update the HMLM thereby to make future decisions in the FPS (302). The electrical switching circuit (315) comprises at least one circuit breaker (320) and at least one trip-unit (316).

According to the fifth aspect of another embodiment, the at least one trip-unit (316) comprises at least one protection controller (317), a second communication terminal (318) and at least one actuator (319). The protection controller (317) is configured to: receive the time stamped data and the local decision from the EAD (308) through the second communication terminal (318) via the communication interface (314); and process the time stamped data and the local decision using decision making firmware to make decisions to control the at least one actuator that is connected to the at least one circuit breaker (320) in the electrical switching circuit (315).

Figure 4:
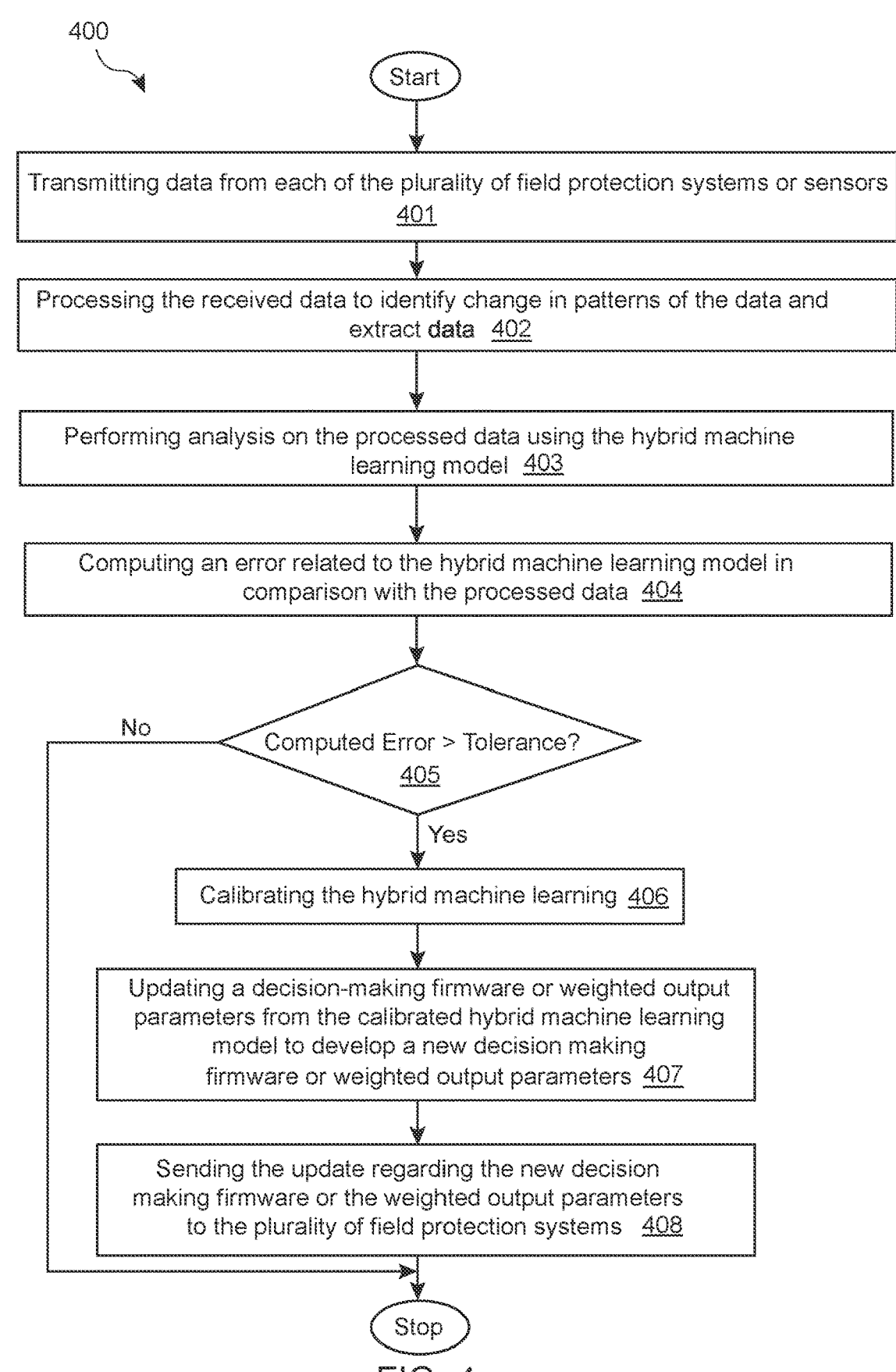
FIG. 4 is a flowchart for a method for protecting an electric power distribution system integrated with a hybrid machine-learning model (HMLM) according to the present disclosure.
Figure 5:
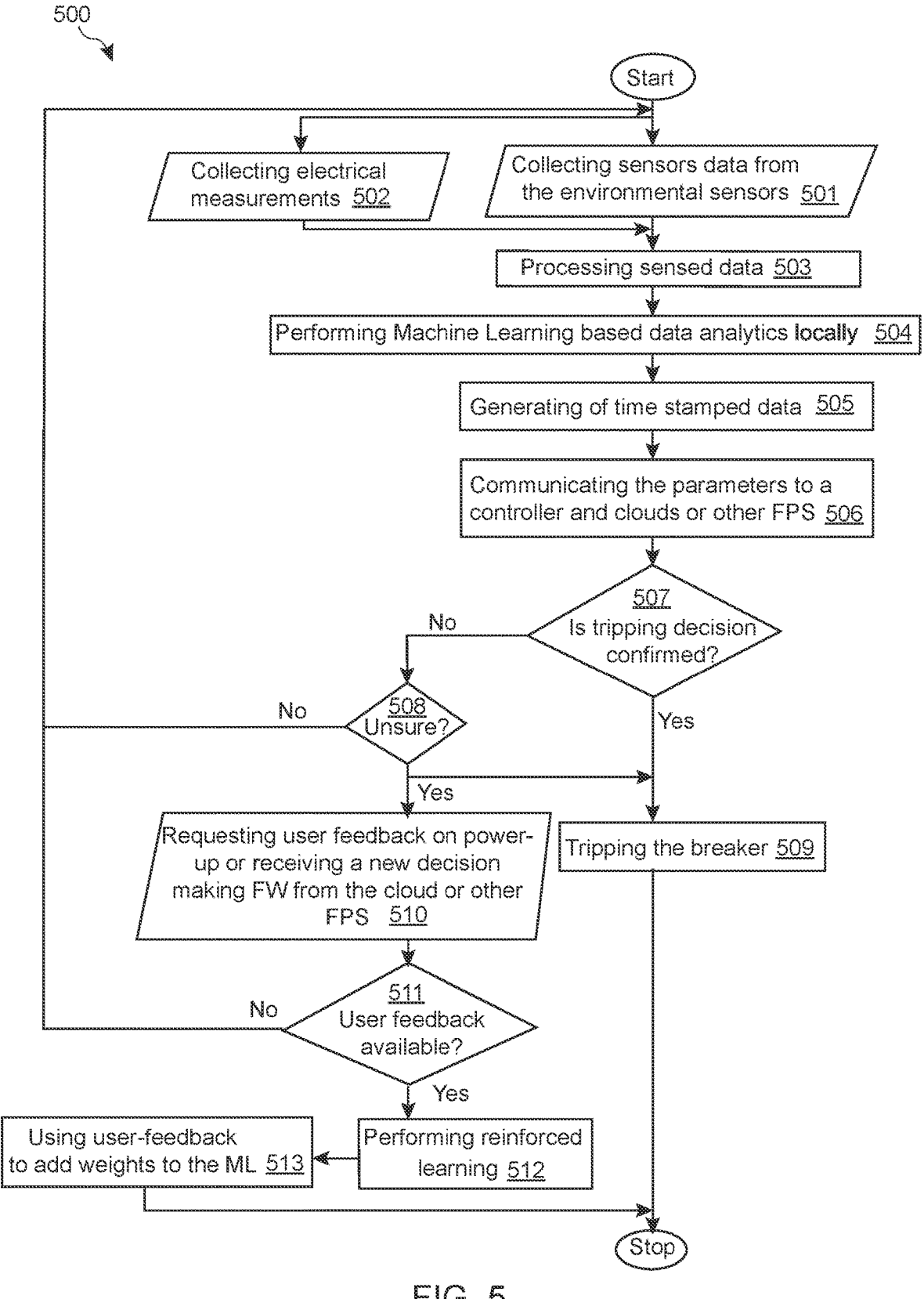
FIG. 5 is a flowchart for a method implemented in a field protection system (FPS) integrated with a hybrid machine-learning model (HMLM) according to the present disclosure.
Figure 6:
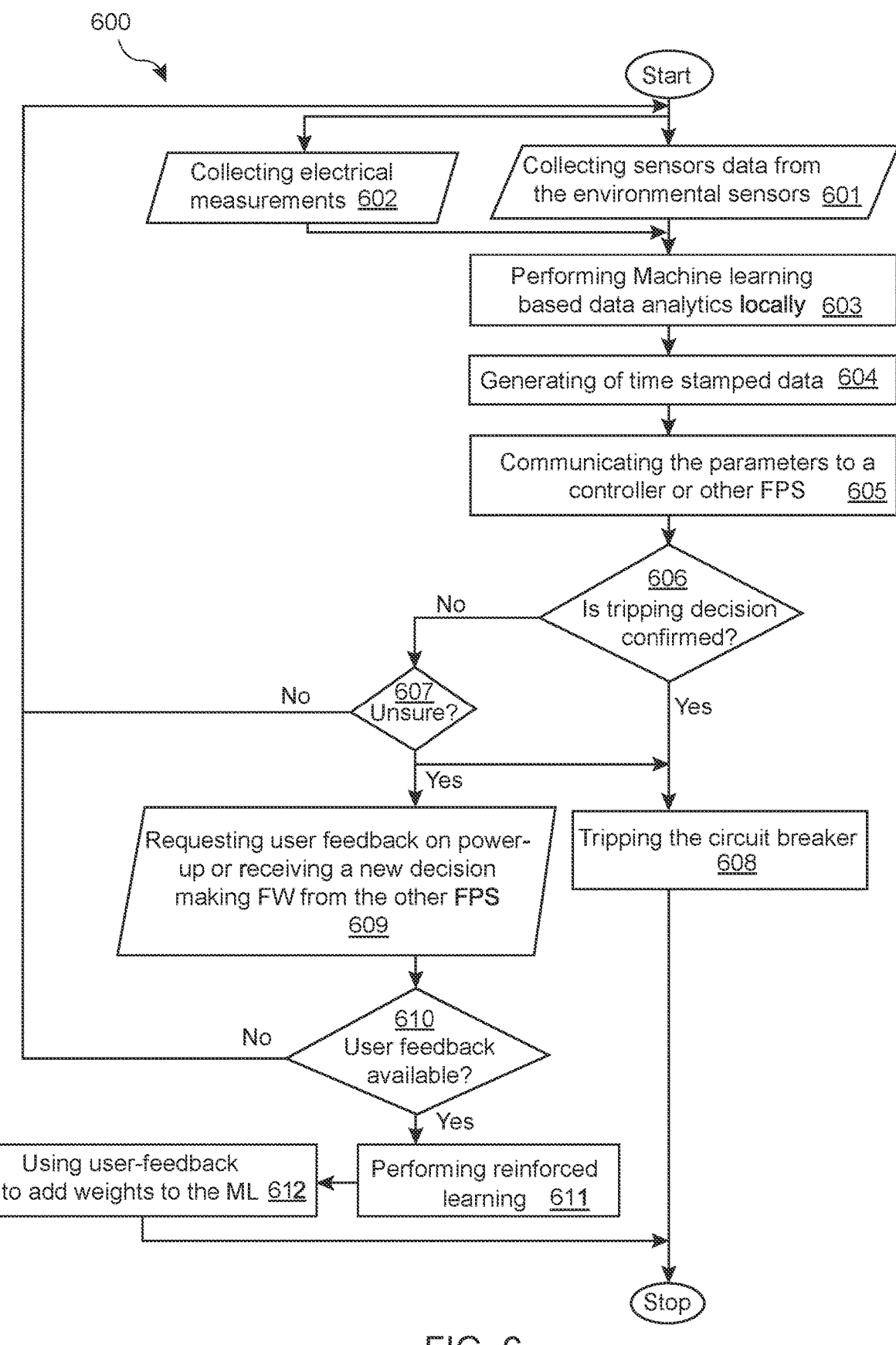
FIG. 6 is a flowchart for a method implemented in a field protection system (FPS) integrated with a hybrid machine-learning model (HMLM) according to the present disclosure.

FIG. 4 illustrates a method for protecting an electric power distribution system integrated with a hybrid machine-learning model (HMLM) 400, according to a second aspect of another embodiment. The methods that are illustrated in FIG. 4-FIG. 6, as a collection of operations in a logical flow graph represent a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be deleted from the methods without departing from the scope of the subject matter described herein. In the context of software, the operations represent computer instructions that, when executed by one or more processors, perform the recited operations.

According to the second aspect of another embodiment, the method implemented in an electric power distribution protection system integrated with a hybrid machine-learning model (HMLM) comprises the steps discussed below.

Step 401 includes transmitting continuously or periodically, a data from each of the plurality of field protection systems (FPSs) to the one or more servers of a central server from the plurality of FPSs; at step 402, processing the received data to identify change/fluctuations in patterns/signals of the data that are time stamped and extract/recognize data that are changed in patterns from a predefined list of data provided in the HMLM;

Step 403 includes performing analysis on the processed data using the HMLM; at step 404, computing an error related to the HMLM in comparison with the processed data; at step 405, checking whether the computed error is above a tolerance that is predefined for the electrical switching circuit based on load and other environmental conditions; at step 406, if the error is above the tolerance level then calibrating the HMLM to minimize the error; otherwise the FPS use the earlier decision making firmware (FM) for decision making;

Step 407 includes updating a decision-making firmware or weighted output parameters of the plurality of field protection system, from the calibrated hybrid machine-learning model to develop a new decision making firmware or a weighted output parameters; and at step 408, sending the update regarding the new decision making firmware or the weighted output parameters to the plurality of FPSs to control actuation of each of the connected plurality of the electrical switching circuits.

FIG. 5 illustrates a method implemented in a field protection system (FPS) that is integrated with a hybrid machine-learning model (HMLM) 500, according to a fourth aspect of another embodiment. According to a fourth aspect of another embodiment, there is provided a method implemented in a field protection system (FPS) integrated with a hybrid machine-learning model (HMLM) comprising the steps of:

at step 501, collecting a data that includes a plurality of non-electrical parameters from a plurality of sensors of each of a plurality of electrical switching circuit that are connected to the FPS; at step 502, collecting a data that includes a plurality of electrical and non-electrical parameters from a plurality of sensors of each of a plurality of electrical switching circuit that are connected to the FPS; transmitting the data to a signal-conditioning unit;

at step 503, processing, at the signal-conditioning unit, the data received from the plurality of sensors, compatible for communicating with a central server and transmitting continuously or periodically, the processed data to a controller and an edge analytic device (EAD). The transmitted data/digital signal is obtained at an appropriate sampling rate and a sampling frequency depends on a type of sensor that is connected to the signal-conditioning unit. Optimal selection of the sampling rate can help to achieve maximum efficiency of a data acquisition system/input avoiding unnecessary load on the FPS and the cloud. This calls for different packet structures depending on the type and nature of the sensed data. A properly defined packet structure for communication with a reasonable number of bits of encryption is recommended to be used for cyber security compliance.

According to the fourth aspect of another embodiment, the method further comprising the steps of, at step 504, performing supervised or unsupervised machine learning based data analytics locally at the EAD, from the data that are received from the signal-conditioning unit and extracting data that are changed in patterns from a predefined list of data provided in the HMLM; and making local decisions based on a Machine-learning algorithm and data extracted thereby to reduce delay in tripping the circuit breaker under critical situation and to fine-tune the FPS according to a working environment.

Step 505 includes generating time stamped data from the extracted data and encrypting the time stamped data for data security; at step 506, communicating the parameters to a controller and a central server/cloud or other FPS. The central server comprising one or more servers that are connected to the FPS through a communication network. The time stamped data and the local decision is transmitted to the controller through a first communication interface. The controller configured to receive the time stamped data and the local decision through a second communication interface from the first communication interface of the EAD and process the time stamped data and the local decision using decision making firmware to make decisions to control actuation of each of the connected plurality of the electrical switching circuits. The electrical switching circuits include but are not limited to one or more circuit breaker and one or more trip-unit. Further, the time stamped data is transmitted continuously or periodically, from the controller or the EAD to the one or more servers of the central server or the cloud or other field protection systems (FPSs) that are connected through the same LAN.

Step 507 includes checking whether the tripping decision is confirmed from the local decision made by the HMLM; at step 509 if the decision is confirmed then trip the circuit breaker; otherwise at step 508, checking whether the local decision is made under critical situation. i.e. unsure about the decision made; if so then forward the process to step 510 and simultaneously trip the circuit breaker. If the decision made is based on sure decisions then repeat the data collection process at step 501.

Step 510 includes receiving, at the controller, a new decision making firmware or weighted output parameters for the FPS from the one or more servers or the other FPSs based on a calibration of the HMLM; and requesting user feedback on power-up to perform reinforced learning under critical situation to avoid nuisance tripping.

Step 511 includes checking whether user feedback is available or not; at step 512, perform reinforced learning based on user feedback; and at step 513, utilizing the new decision making firmware or the weighted output parameters to update the HMLM thereby to avoid nuisance tripping in the FPS. The non-electrical parameter includes but is not limited to bus-bar temperatures, accelerometer data, vibrations recorded, ambient environmental temperature, level of humidity near the electrical switching circuits, geographical location, ambient Electromagnetic field Intensity (EMI) characteristics, building characteristics, and the like. The non-electrical parameter includes but is not limited to device ID, phase current, phase voltage, power-factor, arc signatures, load characteristics, building characteristics, nuisance trip and trip or no trip or pick-up or drop out signals, and the like.

FIG. 6 illustrates a method implemented in a field protection system (FPS) integrated with a hybrid machine-learning model (HMLM) 600, according to a sixth aspect of another embodiment. According to the sixth aspect of another embodiment, the steps performed by the FPS from 601 to 604 are repeated in a fashion that is similar to that of steps 501-505 of FIG. 5. According to the sixth aspect of another embodiment, at step 605, communicating the parameters to a controller or other FPS and the decision from cloud is not required. The time stamped data and the local decision is transmitted to the controller through a first communication interface. The controller is configured to receive the time stamped data and the local decision through a second communication interface from the first communication interface of the EAD and process the time stamped data and the local decision using decision making firmware to make decisions to control actuation of each of the connected plurality of the electrical switching circuits. The electrical switching circuits include but are not limited to one or more circuit breaker and one or more trip-unit. Further, the time stamped data is transmitted continuously or periodically, from the controller or the EAD to other field protection systems (FPSs) that are connected through the same LAN. According to the sixth aspect of another embodiment, the steps performed by the FPS from 606 to 612 are repeated in a fashion similar to that of steps performed by the FPS from 507 to 513 of FIG. 5.

Figure 7:
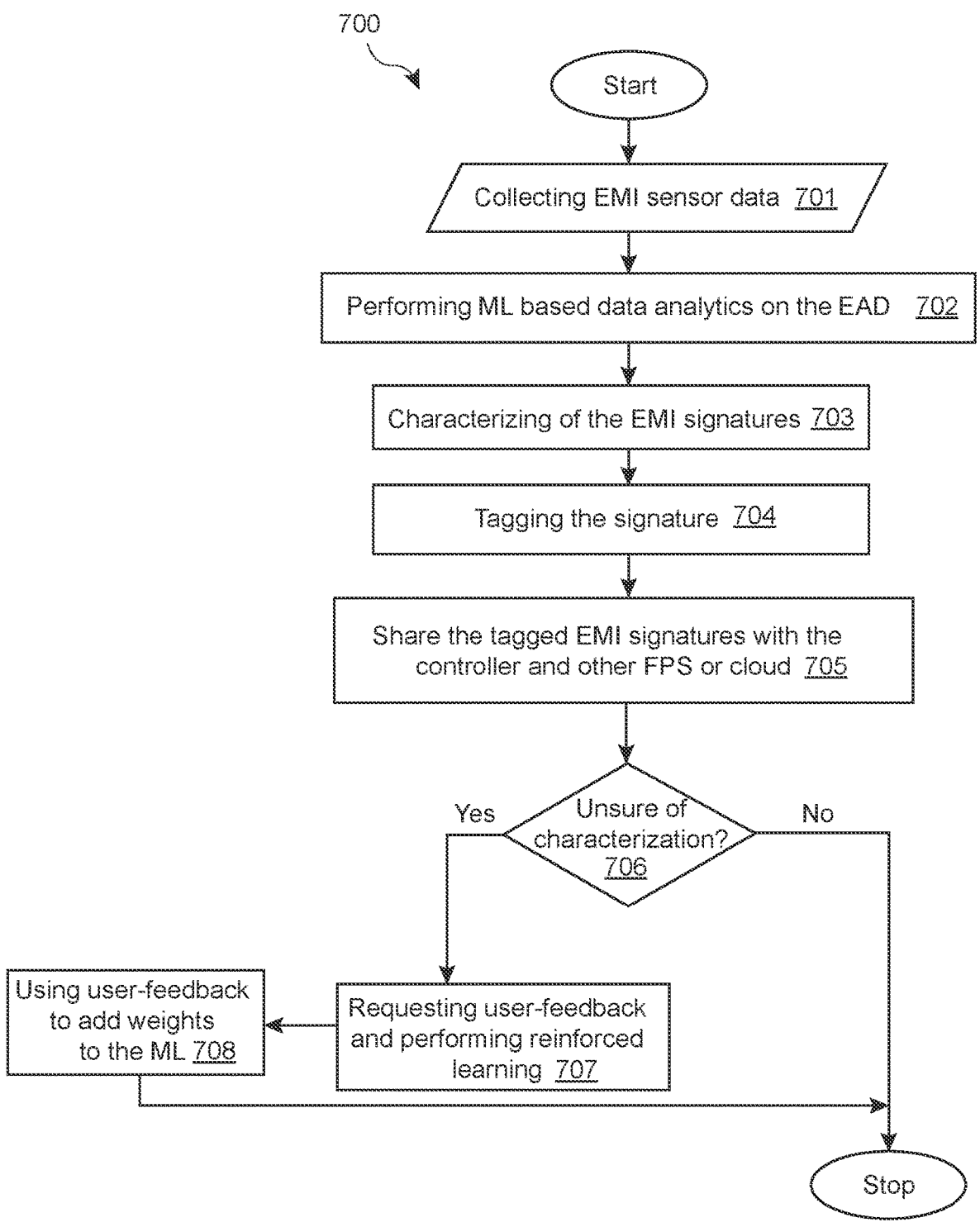
FIG. 7 is a flowchart for an exemplary method implemented in a field protection system (FPS) for EMI source characterization in accordance with the disclosure.

FIG. 7 illustrates an exemplary embodiment of a method implemented in a field protection system (FPS) for EMI source characterization 700, according to third aspect through sixth aspects of another embodiment. The method implemented in a field protection system (FPS) for EMI source characterization comprises the steps of:

at step 701, collecting data from EMI sensors (206) of the sensor unit (302) through the sensor interface (307), at the EAD; at step 702, performing supervised or unsupervised machine learning locally from data that are received from EMI sensors (206) of the sensor unit (302) through the sensor interface (307), at the EAD; at step 703, characterizing EMI signatures by generating EMI parameters from a predefined list of EMI parameters based on the Machine-learning (ML) algorithm and the data that are received from EMI sensors (206); the parameters can be derived from physics aware ML techniques (for example, EMI characterization, load characterization and so on);

at step 704, tagging the characterized EMI signatures with a corresponding EMI source; and at step 705, sharing the tagged EMI signatures, to the controller and the other FPSs that are connected in same LAN, through the communication interface;

The information from one customer site can help a breaker fleet/trip unit by sharing the EMI source characterization; at step 706, checking whether the EAD is unsure about the EMI source characterization; at step 707, requesting user feedback in decision making when the HMLM is unsure about the tagged EMI signatures; and performing reinforced learning based on reception of the user-feedback; and at step 708, adding weighted output parameters to the HMLM using the user-feedback and continue the steps of analyzing the data that are received from the EMI sensors.

According an exemplary embodiment of a method implemented in the FPS for EMI source characterization, the EMI source characterization can be used for identification of the distance of the personnel for activation of automatic RELT mode. The Automatic RELT can be communicated to upstream/downstream through ZSI for enhanced protection coordination. Further, the EMI sensor data augmentation is adaptive to the field environment and trained at a customer site. The information from one customer site can help the breaker fleet/trip unit by sharing the EMI source characterization. This information can be used to develop a robust method to prevent nuisance trips.

Figure 8:
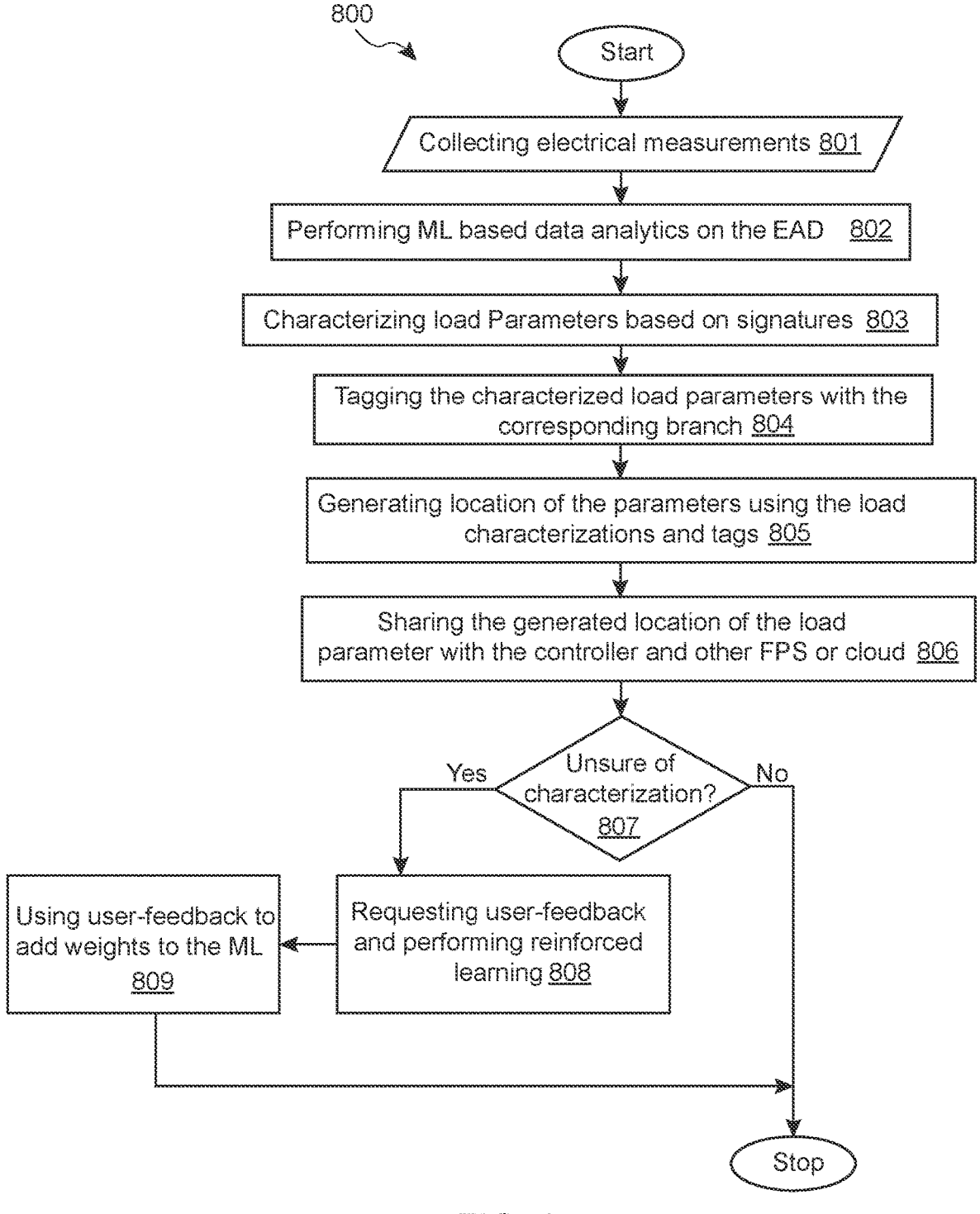
FIG. 8 is a flowchart for an exemplary method implemented in a field protection system (FPS) for Load characterization in accordance with the disclosure.

FIG. 8 illustrates an exemplary embodiment of a method implemented in a field protection system (FPS) for Load characterization, according to third aspect through sixth aspect of some embodiments. The method implemented in a field protection system (FPS) for Load characterization comprising the steps of: at step 801, collecting data from electrical parameter measurement sensors (206) of the sensor unit (302) through the sensor interface (307), at the EAD; the electrical parameter measurement sensors include but are not limited to current, voltage, power factor and so on.

Step 802 includes performing supervised or unsupervised machine learning locally from load characterization data that are received from electrical parameter sensors of the sensor unit through the sensor interface, at the EAD; at step 803, characterizing load parameters by generating load parameter from a predefined list of load parameters based on the Machine-learning (ML) algorithm and the data that are received from the electrical parameter sensors; i.e. Data analytics based characterization for enhanced protection management;

Further, step 804 includes tagging the load characterization parameters with a corresponding branch of the electrical power distribution circuit; at step 805, generating location of the load parameters using the load characterization tags; and at step 806, sharing the load characterization parameters and the load location parameters, to the controller and the other FPSs that are connected in same LAN, through the communication interface; at step 807, checking whether the EAD is unsure about the load characterization;

Step 808 includes requesting user feedback in decision making when the HMLM is unsure about the tagged load characterization parameters; and performing reinforced learning based on reception of the user-feedback; and at step 809, adding weighted output parameters to the HMLM using the user-feedback and continue the steps of analyzing the data that are received from the electrical parameter sensors. Hence, the method characterizes individual load and tags with the corresponding branch, complex ML algorithms on the EAD may not require cloud to communicate within breaker fleet. The reinforced learning of one breaker fleet/ FPS can be used for the other FPSs that are connected in a mesh electrical power distribution network. The method can characterize a combination of loads generating complex signatures.

According to an exemplary embodiment, the method implemented in a field protection system (FPS) for building characterization comprises the steps of: receiving the load characterization parameters and the load location parameters from the other FPSs, at the EAD; generating building characterization based on the load characterization parameters and the load location parameters; and sharing the building characterization, to the controller and the other FPSs that are connected in same LAN, through the communication interface. The method for building characterization through the load-characterization enables better protection management by characterizing each room/section of the building with individual loads, and by adding intelligence of why certain signatures are not expected from certain parts of the building/section (for example, microwave in bathroom). The building characterization further provides a robust arc-fault protection and complete prevention of nuisance trips with the arc-fault protection system. The system can be adaptable with new generation loads and equipment and data analytics can be augmented with other home automation data (viz., Alexa or Google Home or ABB Home automation suite).

An advantage of the above mentioned system for protecting the electrical power distribution is to use cloud based data analytics on the data that are collected from all protection devices in the field for performance optimization, advanced protection schemes by understanding the device behavior under various operating conditions and asset management. Further, the system enhances performance of the protection devices or systems by upgrading the decision making capability of existing protection systems. As part of predictive decisions, analysis of historical data and its relation to the actual event with network topology gives the possible future occurrence of the event, allows many optimized prospective threshold settings prescription to a customer for given load and monitoring conditions and allows advanced protection thresholds for the system.

Further, the enhanced machine-learning when applied to the distribution protection system, ensures optimized protection settings and trip decision making. Also, the machine-learning methodology is used to receive the learned data from cloud and incorporates it to the established equivalent digital model of the physical protection asset to simulate different field conditions. The lab environment in the form of digital replication of the field device helps easier design of future products resulting from the understanding of variables association for performance of the devices in field.

The system can be applied in Industrial Breakers/Panels to avoid nuisance trip under harsh & noisy EMI Environment. The Industrial Breaker with Automatic RELT Mode based on smart EMI sensing can be implemented and EMI Source Characterization based on Noise Classification for enhanced protection & personnel safety. Further, the system can be applied for residential and commercial breakers/load Centers to ensure smart load-characterization of branch circuits and avoid Nuisance Trip based on load characterization. Further, the smart building characterization can be performed based on load characterization to enhance intelligent building protection management based on the building characterization.

The foregoing description of the specific embodiments will so fully reveal the general nature of the embodiments herein that a person skilled in the art can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

According to the first aspect of an embodiment, the system for protecting an electric power distribution system integrated with a hybrid machine-learning model (HMLM) comprising, a cloud or central server comprising one or more servers connected to a plurality of field protection systems (FPSs) through a communication network. The plurality of field protection systems is connected to a plurality of electrical switching circuits that are configured for protecting the electric power distribution system. The plurality of FPSs are configured to transmit, continuously or periodically, data from each of the plurality of field protection systems to the plurality of FPSs that are connected in a same local area network or one or more servers of the central server. The data includes time stamped processed electrical and non-electrical parameters and signals. The one or more servers comprise a processor and a memory.

According to the first aspect of an embodiment, the processor is configured to process the received data to identify change in patterns of the data that is time stamped, and extract data that is changed in patterns from a predefined list of data provided in the HMLM; and perform analysis on the processed data using the HMLM by computing an error related to the HMLM in comparison with the processed data. Further, the processor is configured to calibrate the HMLM to minimize errors and update a decision-making firmware or weighted output parameters of the plurality of field protection system, from the calibrated HMLM to develop a new decision-making firmware or the weighted output parameters. According to the first aspect of an embodiment, the processor is further configured to send the update regarding the new decision making firmware or the weighted output to the plurality of field protection systems to control actuation of each of the connected plurality of the electrical switching circuits.

According to the first aspect of an embodiment, the plurality of field protection systems is further configured to receive a new decision making firmware or weighted output parameters for the plurality of field protection systems or from another plurality of field protection systems that are connected through the same LAN, thereby to further calibrate the HMLM and utilize the new decision making firmware or the weighted output parameters to update the HMLM thereby to make future decisions in the FPS.

According to the first aspect of an embodiment, the time stamped processed electrical and non-electrical parameters and signals include device ID, phase current, phase voltage, power-factor, bus-bar temperatures, accelerometer data, vibrations recorded, ambient environmental temperature, level of humidity near the electrical switching circuits, geographical location, ambient Electromagnetic field Intensity (EMI) characteristics, arc signatures, load characteristics, building characteristics, nuisance trip and trip or no trip or pick-up or drop out signals.

According to the second aspect of an embodiment, the method implemented in an electric power distribution protection system integrated with a hybrid machine-learning model (HMLM) comprises the steps of transmitting, continuously or periodically, a data from each of the plurality of field protection systems to the one or more servers of a central server from a plurality of field protection systems; processing the received data to identify change in patterns of the data that are time stamped and extract data that is changed in patterns from a predefined list of data provided in the HMLM; performing analysis on the processed data using the HMLM by computing an error related to the HMLM in comparison with the processed data; calibrating the HMLM to minimize the error; updating a decision-making firmware or weighted output parameters of the plurality of field protection system, from the calibrated hybrid machine-learning model to develop a new decision making firmware or a weighted output parameters; and sending the update regarding the new decision making firmware or the weighted output parameters to the plurality of field protection systems to control actuation of each of the connected plurality of the electrical switching circuits. The data includes time stamped processed electrical and non-electrical parameters and signals. The plurality of field protection systems is connected to a plurality of electrical switching circuits configured for protecting the electric power distribution system.

According to a third aspect of another embodiment, the FPS is integrated with a hybrid machine-learning model (HMLM). The FPS is connected to an electrical switching circuit configured for protecting the electric power distribution system. The FPS comprises, a sensing unit, a signal-conditioning unit, an edge analytic device (EAD) and a controller. The sensing unit comprises a plurality of sensors configured to sense a data that includes a plurality of electrical and non-electrical parameters and signals from each of a plurality of electrical switching circuits. The signal-conditioning unit is configured to process the data received from the sensing unit, compatible for communicating with a central server or a cloud, and transmit the processed data to the controller and the EAD. The central server comprises one or more servers that are connected to the FPS through a communication network or a Local Area Network, LAN.

According to the third aspect of another embodiment, the EAD is configured to: perform supervised or unsupervised machine learning locally from the data that is received from the signal-conditioning unit, and extract data that is changed in patterns from a predefined list of data provided in the HMLM. The EAD is further configured to: make local decisions based on a Machine-learning algorithm and the extracted data; time stamp the extracted data; and transmit the time stamped data and the local decision to the controller through a first communication interface. The term "local decision" is used herein to denote the output of the machine learning (supervised or unsupervised or hybrid) algorithms that are being processed in the EAD without requiring communication with the central server or cloud.

According to the third aspect of another embodiment, the controller is configured to: receive the time stamped data and the local decision through a second communication interface from the first communication interface of the EAD; and process the time stamped data and the local decision using decision making firmware to make decisions to control actuation of each of the connected plurality of the electrical switching circuits. The electrical switching circuits comprise one or more circuit breakers and one or more trip-unit.

According to the third aspect of another embodiment, the controller is further configured to transmit, continuously or periodically, the time stamped data to the one or more servers of the central server or the cloud or other field protection systems (FPSs) through the LAN from the controller or through the first communication interface of the edge analytic device, when the controller is bypassed from the LAN or cloud for future decision making. The controller is further configured to: receive a new decision making firmware or weighted output parameters for the FPS from the one or more servers or the other field protection systems through the LAN based on a calibration of the HMLM; and utilize the new decision making firmware or the weighted output parameters to update the HMLM thereby to make future decisions in the FPS.

According to the third aspect of another embodiment, the plurality of electrical and non-electrical parameters and signals includes device ID, phase current, phase voltage, power-factor, bus-bar temperatures, accelerometer data, vibrations recorded, ambient environmental temperature, level of humidity near the electrical switching circuits, geographical location, ambient Electromagnetic field Intensity (EMI), EMI source characteristics, arc signatures, load characteristics, building characteristics, nuisance trip and trip or no trip or pick-up or drop out signals.

According to the third aspect of another embodiment, the controller is further configured to make decisions in a future time on whether to actuate the electrical switching circuits based on a user feedback by reinforced learning under critical situations, after actuating the one or more circuit breaker. The critical situation includes, but is not limited to, unsure decisions of the HMLM related to a change in pattern of the data sensed from the sensing unit of the FPS.

According to a fourth aspect of another embodiment, the method is implemented in a field protection system (FPS) integrated with a hybrid machine-learning model (HMLM) and comprises the steps of collecting a data that includes a plurality of electrical and non-electrical parameters from a plurality of sensors of each of a plurality of electrical switching circuits that are connected to the FPS; transmitting the data to a signal-conditioning unit; processing, at the signal-conditioning unit, the data received from the plurality of sensors, which are compatible for communicating with a central server.

According to the fourth aspect of another embodiment, the method further comprises the steps of transmitting, continuously or periodically, the processed data to a controller and an edge analytic device (EAD); performing supervised or unsupervised learning at the EAD locally, from the data that are received from the signal-conditioning unit, and extracting data that are changed in patterns from a predefined list of data provided in the HMLM; and making local decisions based on a Machine-learning algorithm and data extracted. The central server comprises one or more servers that are connected to the FPS through a communication network.

According to the fourth aspect of another embodiment, the method further comprises the steps of time stamping the extracted data and encrypting the time stamped data for data security; transmitting the time stamped data and the local decision to the controller through a first communication interface; receiving, at the controller, the time stamped data and the local decision through a second communication interface from the first communication interface of the EAD; and processing, at the controller, the time stamped data and the local decision using decision making firmware to make decisions to control actuation of each of the connected plurality of the electrical switching circuits that comprise one or more circuit breaker and one or more trip-unit.

According to the fourth aspect of another embodiment, the method further comprises the steps of transmitting, continuously or periodically, the time stamped data from the controller or the EAD to the one or more servers of the central server or the cloud or other field protection systems that are connected through the same LAN; receiving, at the controller, a new decision making firmware or weighted output parameters for the FPS from the one or more servers, or from other field protection systems, based on a calibration of the HMLM; and utilizing the new decision making firmware or the weighted output parameters to update the HMLM to avoid nuisance tripping in the FPS.

According to a fifth aspect of another embodiment, the FPS is integrated with a hybrid machine-learning model (HMLM) for protecting the electric power distribution system. The FPS comprises a sensing unit, a signal-conditioning unit, an edge analytic device (EAD), and a controller. The sensing unit comprises a plurality of sensors configured to sense data that includes a plurality of electrical and non-electrical parameters from each of a plurality of electrical switching circuits, and transmit the data to an edge analytic device (EAD). The EAD comprises a processor, a sensor interface, and a first communication terminal. The processor is a high performance computer (HPC).

According to the fifth aspect of another embodiment, the processor is configured to: perform supervised (i.e., user assisted or manual) or unsupervised (machine) learning locally from the data that is received from the sensing unit through the sensor interface and extract data that is changed in patterns from a predefined list of data provided in the HMLM; and make local decisions based on a Machine-learning algorithm and the extracted data. The processor is further configured to: time stamp the extracted data; and transmit the time stamped data and the local decision to an electrical switching circuit through the first communication terminal via a communication interface.

According to the fifth aspect of another embodiment, the processor is further configured to: encrypt the time stamped data for data security; communicate the encrypted time stamped data to other field protection systems through the first communication terminal via the LAN thereby to calibrate the HMLM; and utilize the new decision making firmware or the weighted output parameters to update the HMLM thereby to make future decisions in the FPS. The electrical switching circuit comprises at least one circuit breaker and at least one trip-unit.

According to the fifth aspect of another embodiment, the at least one trip-unit comprises at least one protection controller, a second communication terminal and at least one actuator. The protection controller is configured to: receive the time stamped data and the local decision from the EAD through the second communication terminal via the communication interface; and process the time stamped data and the local decision using decision making firmware to make decisions to control the at least one actuator that is connected to the at least one circuit breaker in the electrical switching circuit.

According to a sixth aspect of another embodiment, the method is implemented in a field protection system (FPS) integrated with a hybrid machine-learning model (HMLM) comprising the steps of collecting data that includes a plurality of electrical and non-electrical parameters from a plurality of sensors of each of a plurality of electrical switching circuits that is connected to the FPS; transmitting the data to an edge analytic device (EAD); performing supervised or unsupervised machine learning locally at the EAD, from the data that is received from the plurality of sensors through the sensor interface, and extracting data that are changed in patterns from a predefined list of data provided in the HMLM; making local decisions based on a Machine-learning algorithm and the extracted data.

According to the sixth aspect of another embodiment, the method further comprises the steps of time stamping the extracted data and encrypting the time stamped data at the EAD for data security; and transmitting the time stamped data and the local decision to an electrical switching circuit through a first communication terminal of the EAD via a communication interface.

According to the sixth aspect of another embodiment, the method further comprises the steps of, receiving, at a second communication terminal of a protection controller of a trip unit of the electrical switching circuit, the time stamped data and the local decision from the EAD through the communication interface; and processing the time stamped data and the local decision using decision making firmware to make decisions to control an at least one actuator that is connected to a at least one circuit breaker in the electrical switching circuit.

According to the sixth aspect of another embodiment, the method further comprises the steps of communicating the encrypted time stamped data to other field protection systems through the first communication terminal via the LAN thereby to calibrate the HMLM; and receiving the new decision making firmware or the weighted output parameters to update the HMLM and to avoid nuisance tripping in the FPS.

Effects and features of the second through sixth aspects are to a large extent analogous to those described above in connection with the first aspect. Embodiments mentioned in relation to the first aspect are largely compatible with the second through sixth aspects.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

The present disclosure will become apparent from the detailed description given below. These and other aspects of the embodiments and other objects and advantages of the present invention herein will be better appreciated and understood when considered in conjunction with the following description and the accompanying drawings. The accompanying drawings are incorporated for illustration of preferred embodiments of the present invention and are not intended to limit the scope thereof. It should be understood, however, that the following descriptions, while indicating preferred embodiments and numerous specific details thereof, are given by way of illustration and not of limitation. Different configuration changes and modifications may be made within the scope of the embodiments herein without departing from the spirit thereof, and the embodiments herein include all such modifications.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for protecting an electric power distribution system integrated with a hybrid machine-learning model comprises:

a cloud or central server comprising one or more servers connected to a plurality of field protection systems (FPSs) through a communication network; wherein the plurality of field protection systems is connected to a plurality of electrical switching circuits that are configured for protecting the electric power distribution system;

wherein the plurality of field protection systems is configured to transmit, continuously or periodically, data from each of the plurality of field protection systems to the plurality of field protection systems that is connected in a same local area network (LAN) or one or more servers of the central server; wherein the data includes time stamped processed electrical and non-electrical parameters and signals;

wherein the one or more servers comprises a processor and a memory; and wherein the processor is configured to:

process the received data to identify change in patterns of the data that is time stamped and extract data that is changed in patterns from a predefined list of data provided in the HMLM;

perform analysis on the processed data using the HMLM by computing an error related to the HMLM in comparison with the processed data;

calibrate the HMLM to minimize the error;

update a decision-making firmware or weighted output parameters of the plurality of field protection systems from the calibrated hybrid machine-learning model to develop a new decision making firmware or the weighted output parameters; and send the update regarding the new decision making firmware or the weighted output to the plurality of field protection systems to control actuation of each of the connected plurality of the electrical switching circuits.

2. The system as claimed in claim 1, wherein the plurality of field protection systems is further configured to:

receive a new decision making firmware or weighted output parameters for the plurality of field protection systems from another plurality of field protection systems that is connected through the same LAN to calibrate the HMLM; and utilize the new decision making firmware or the weighted output parameters to update the HMLM to make future decisions in the FPS.

3. The system as claimed in claim 1, wherein the time stamped processed electrical and non-electrical parameters and signals include device ID, phase current, phase voltage, power-factor, bus-bar temperatures, accelerometer data, vibrations recorded, ambient environmental temperature, level of humidity near the electrical switching circuits, geographical location, the ambient Electromagnetic field Intensity (EMI), the EMI source characteristics, arc signatures, load characteristics, building characteristics, nuisance trip and trip or trip or no trip or pick-up or drop out signals.

4. A method implemented in an electric power distribution protection system integrated with a hybrid machine-learning model (HMLM), comprising:

transmitting, continuously or periodically, data from each of the plurality of field protection systems to one or more servers of a central server from a plurality of field protection systems; wherein the data includes time stamped processed electrical and non-electrical parameters and signals; wherein the plurality of field protection systems is connected to a plurality of electrical switching circuits configured for protecting the electric power distribution system;

processing the received data to identify change in patterns of the data that is time stamped, and extract data that is changed in patterns from a predefined list of data provided in the HMLM;

performing analysis on the processed data using the HMLM by computing an error related to the HMLM in comparison with the processed data;

calibrating the HMLM to minimize the error;

updating a decision-making firmware or weighted output parameters of the plurality of field protection system, from the calibrated hybrid machine-learning model, to develop a new decision making firmware or a weighted output parameters; and sending an update regarding the new decision making firmware or the weighted output parameters to the plurality of field protection systems to control actuation of each of the connected plurality of the electrical switching circuits.

5. A field protection system (FPS) integrated with a hybrid machine-learning model (HMLM), wherein the FPS is connected to an electrical switching circuit configured for protecting an electric power distribution system, the FPS comprising:

a sensing unit comprising a plurality of sensors configured to sense data that includes a plurality of electrical and non-electrical parameters and signals from each of a plurality of electrical switching circuits;

a signal-conditioning unit configured to process the data received from the sensing unit, and transmit the processed data to a controller and to an edge analytic device (EAD);

wherein a central server comprising one or more servers is connected to the FPS through a communication network or a Local Area Network;

wherein the EAD is configured to:

perform supervised or unsupervised machine learning locally from the data that is received from the signal-conditioning unit and extract data that is changed in patterns from a predefined list of data provided in the HMLM;

make local decisions based on a Machine-learning (ML) algorithm and the extracted data;

time stamp the extracted data; and transmit the time stamped data and the local decision to the controller through a first communication interface;

wherein the controller is configured to:

receive the time stamped data and the local decision through a second communication interface from the first communication interface of the EAD;

process the time stamped data and the local decision using decision making firmware to make decisions to control actuation of each of the connected plurality of the electrical switching circuits that comprises one or more circuit breakers and one or more trip-units;

transmit, continuously or periodically, the time stamped data to the one or more servers of the central server or the cloud or other field protection systems through the local area network (LAN) from the controller or through the first communication interface of the edge analytic device, when the controller is bypassed from the LAN or cloud for future decision making;

receive a new decision making firmware or weighted output parameters for the FPS from the one or more servers or the other field protection systems through the LAN based on a calibration of the HMLM; and utilize the new decision making firmware or the weighted output parameters to update the HMLM thereby to make future decisions in the FPS.

6. The FPS as claimed in claim 5, wherein the plurality of electrical and non-electrical parameters and signals includes device ID, phase current, phase voltage, power-factor, bus-bar temperatures, accelerometer data, vibrations recorded, ambient environmental temperature, level of humidity near the electrical switching circuits, geographical location, the ambient Electromagnetic field Intensity (EMI), the EMI source characteristics, arc signatures, load characteristics, building characteristics, nuisance trip and trip or no trip or pick-up or drop out signals.

7. The FPS as claimed in claim 5, wherein the controller is further configured to make future decisions on whether to actuate the electrical switching circuits based on user feedback by reinforced learning under critical situations, after actuating the one or more circuit breakers; wherein the critical situation includes unsure decisions of the HMLM related to a change in pattern of the data sensed from the sensing unit of the FPS.

8. A method implemented in a field protection system (FPS) integrated with a hybrid machine-learning model (HMLM), comprising:

collecting data that includes a plurality of electrical and non-electrical parameters from a plurality of sensors of each of a plurality of electrical switching circuit that are connected to the FPS;

transmitting the data to a signal-conditioning unit;

processing, at the signal-conditioning unit, the data received from the plurality of sensors, compatible for communicating with a central server;

transmitting, continuously or periodically, the processed data to a controller and an edge analytic device (EAD);

wherein the central server comprises one or more servers that are connected to the FPS through a communication network;

performing supervised or unsupervised machine learning locally at the EAD, from the data that are received from the signal-conditioning unit, and extracting data that is changed in patterns from a predefined list of data provided in the HMLM;

making local decisions based on a Machine-learning (ML) algorithm and data extracted;

time stamping the extracted data and encrypting the time stamped data for data security;

transmitting the time stamped data and the local decision to the controller through a first communication interface;

receiving, at the controller, the time stamped data and the local decision through a second communication interface from the first communication interface of the EAD;

processing, at the controller, the time stamped data and the local decision using decision making firmware to make decisions to control actuation of each of the connected plurality of electrical switching circuits that comprises one or more circuit breakers and one or more trip-unit;

transmitting, continuously or periodically, the time stamped data from the controller or the EAD to the one or more servers of the central server or the cloud or other field protection systems that are connected through the same LAN;

receiving, at the controller, a new decision making firmware or weighted output parameters for the FPS from the one or more servers or the other field protection systems based on a calibration of the HMLM; and utilizing the new decision making firmware or the weighted output parameters to update the HMLM thereby to avoid nuisance tripping in the FPS.

9. A field protection system (FPS) integrated with a hybrid machine-learning model (HMLM) for protecting the electric power distribution system, the FPS comprising:

a sensing unit comprising a plurality of sensors configured to sense data that includes a plurality of electrical and non-electrical parameters from each of a plurality of electrical switching circuits, and transmit the data to an edge analytic device (EAD); wherein the EAD comprises a processor, a sensor interface and a first communication terminal; wherein the processor is configured to:

perform supervised or unsupervised machine learning locally from the data that is received from the sensing unit through the sensor interface, and extract data that changed in patterns from a predefined list of data provided in the HMLM;

make local decisions based on a Machine-learning (ML) algorithm and the extracted data;

time stamp the extracted data;

transmit the time stamped data and the local decision to an electrical switching circuit through the first communication terminal via a communication interface;

encrypt the time stamped data for data security;

communicate the encrypted time stamped data to other field protection systems through the first communication terminal via the LAN to calibrate the HMLM; and utilize the new decision making firmware or the weighted output parameters to update the HMLM to make future decisions in the FPS;

wherein the electrical switching circuit comprises at least one circuit breaker and at least one trip-unit; wherein the at least one trip-unit comprises at least one protection controller, a second communication terminal and at least one actuator;

wherein the protection controller is configured to:

receive the time stamped data and the local decision from the EAD through the second communication terminal via the communication interface; and process the time stamped data and the local decision using decision making firmware to make decisions to control the at least one actuator that is connected to the at least one circuit breaker in the electrical switching circuit.

10. A method implemented in a field protection system (FPS) integrated with a hybrid machine-learning model (HMLM), comprising:

collecting data that includes a plurality of electrical and non-electrical parameters from a plurality of sensors of each of a plurality of electrical switching circuit that are connected to the FPS;

transmitting the data to an edge analytic device (EAD);

performing supervised or unsupervised machine learning locally at the EAD, from the data that is received from the plurality of sensors through the sensor interface, and extracting data that is changed in patterns from a predefined list of data provided in the HMLM;

making local decisions based on a Machine-learning (ML) algorithm and the extracted data;

time stamping the extracted data and encrypting the time stamped data at the EAD for data security;

transmitting the time stamped data and the local decision to an electrical switching circuit through a first communication terminal of the EAD via a communication interface;

receiving, at a second communication terminal of a protection controller of a trip unit of the electrical switching circuit, the time stamped data and the local decision from the EAD through the communication interface; and processing the time stamped data and the local decision using decision making firmware to make decisions to control at least one actuator that is connected to at least one circuit breaker in the electrical switching circuit;

communicating the encrypted time stamped data to other field protection systems through the first communication terminal via the LAN to calibrate the HMLM; and receiving the new decision making firmware or the weighted output parameters to update the HMLM thereby to avoid nuisance tripping in the FPS.

11. The system as claimed in claim 1, wherein the time stamped processed electrical and non-electrical parameters and signals include ambient Electromagnetic field Intensity (EMI) and EMI source characteristics obtained by an EMI sensing unit, and wherein each of the field protection systems is configured to implement a machine learning (ML) algorithm to characterize EMI signatures by generating EMI parameters using the ambient EMI and the EMI source characteristics and tag the EMI source characteristics with a corresponding EMI source.

* * * * *